United States Patent [19]
Van Hamme

[11] Patent Number: 6,044,340
[45] Date of Patent: Mar. 28, 2000

[54] ACCELERATED CONVOLUTION NOISE ELIMINATION

[75] Inventor: Hugo Van Hamme, Vilvoorde, Belgium

[73] Assignee: Lernout & Hauspie Speech Products N.V., Ypres, Belgium

[21] Appl. No.: 09/023,291

[22] Filed: Feb. 13, 1998

Related U.S. Application Data

[60] Provisional application No. 60/038,468, Feb. 21, 1997.

[51] Int. Cl.[7] .................................. G10L 3/02; G10L 9/00; G10L 5/06
[52] U.S. Cl. .............................................. 704/226; 704/233
[58] Field of Search ..................................... 704/226, 201, 704/233, 211

[56] References Cited

U.S. PATENT DOCUMENTS

| | | | |
|---|---|---|---|
| 5,450,522 | 9/1995 | Hermansky et al. | 704/211 |
| 5,537,647 | 7/1996 | Hermansky et al. | 395/2.2 |
| 5,598,505 | 1/1997 | Austin et al. | 704/226 |

OTHER PUBLICATIONS

Rabiner, Lawrence, et al, "Fundamentals of Speech Recognition", *Prentice Hall*, 1993, pp. 95, 96 and 99.

de Veth, Johan, et al, "Comparison of Channel Normalization Techniques for Automatic Speech Recognition Over the Phone", *Proceedings ICSLP–96*, pp. 2332–2355, 1996.

de Veth, Johan, et al, "Phase–Corrected Rasta for Automatic Speech Recognition Over the Phone", *Proceedings ICAASP–97*, Apr. 21–24, Munich, Germany, pp. 12339–1242, 1997.

Peter–Pal, Boda, et al "Channel Normalization by Using Rasta Filtering and the Dynamic Cepstrum for Automatic Speech Recognition Over the Phone", *Proceedings ESCA Workshop Auditory Basis Speech Perception*, pp. 317–320, 1986.

Gales M J F et al: "Robust Spech Recognition in Additive and Convolutional Noise Using Parallel Model Combination" Computer Speech and Language, vol. 9, No. 4, Oct. 1995, pp. 289–307.

Matsumoto H et al: "Smoothed Spectral Subtraction for a Frequency–Weighed HMM in Noisy Speech Recognition" Proceedings Icslp '96, Philadelphia, PA, USA, Oct. 3–6, 1996, ISBN 0–7803–3555–4, 1996, New York, NY, USA, IEEE, USA, pp. 905–908 vol. 2.

Claes et al: "Spectral Estimation and Normalisation for Robust Speech Recognition" Proceedings ICSLP 96. Fourth International Conference on Spoken Language Processing (CAT. No. 96TH8206), Proceeding of Fourth International Conference on Spoken Language Processing. ICSLP'96, Philadelphia, PA, USA, Oct. 3–6, 1996, ISBN 0–7803–3555–4. 1996, New York, NY, USA, IEEE, USA, pp. 1997–2000 vol. 4.

Vereecken H et al: "Noise Suppression and Loudness Normaliztion in an Auditory Model–Based Acoustic Front–end" Proceedings ICSLP 96, Philadelphia, PA, USA, Oct. 3–6, 1996, ISBN 0–7803–3555–4, 1996, New York, NY, USA, IEEE, USA, pp. 566–569 vol. 1.

Strube H W: "Fast Straight–Line–Train Fitting Algorithm for Application With Olive's Speech–Coding Method" Journal of the Acoustic Society of America, May 1978, USA, vol. 63, No. 5, ISSN 0001–4966, pp. 1636–1637.

*Primary Examiner*—David R. Hudspeth
*Assistant Examiner*—Susan Wieland
*Attorney, Agent, or Firm*—Bromberg & Sunstein LLP

[57] ABSTRACT

A method and apparatus for removing convolution noise from a signal such a one carrying speech information. The signal is transformed into a log-spectral domain where a smoothed model is fitted to the log-spectrum subject to constraints of concavity and an overall bandpass shape. The smoothed model has quadratic segments of negative curvature and linear segments, the segments being smoothly joined at breakpoints. The model, which may be recursively updated, is subtracted from each log-spectral data vector.

25 Claims, 2 Drawing Sheets

ACCELERATED CONVOLUTION NOISE ELIMINATION

The present application claims priority from U.S. provisional application No. 60/038,468, filed Feb. 21, 1997, which is herein incorporated by reference.

TECHNICAL FIELD

The present invention pertains to a method and apparatus for eliminating convolution noise arising over a communications channel in order, for example, to facilitate automatic recognition of speech features that are channel-independent.

BACKGROUND OF THE INVENTION

While speech recognition by humans is very robust against stationary distortions of the speech signal introduced by the speech pickup and reproduction equipment and by the telephone channel, these distortions, effectively filtering the speech signal, may degrade the performance of automatic speech recognition systems. In order for speech to be recognized automatically, a parametric representation of the incoming speech is produced which is optimally independent, to the degree possible, of the enumerated noise sources.

The effect of noise sources such as those enumerated is convolutional rather than additive, and thus appears as an additive disturbance in the log-power domain in which each frequency band is characterized by the logarithm of an estimate of the signal power in that band. Signal analysis in log-spectral and cepstral domains is discussed in Rabiner and Juang, *Fundamentals of Speech Recognition*, (Prentice Hall, 1993), which is incorporated herein by reference. Convolutional noise is typically constant or slowly varying. A known technique for removal of convolutional noise, otherwise known as "channel normalization," is the removal of a mean in either the log-power domain or the cepstral domain corresponding to a further transform of the logarithm of the Fourier transform of the time-domain signal.

Typical convolution noise elimination based on mean removal entails three steps:

a. selecting signal portions containing speech to be used in calculating a mean;

b. computing the mean, averaged over a time duration typically on the order of seconds to tens of seconds, of the mean power in each log-power band;

c. subtracting the mean, on a band-by-band basis, from the signal in each band.

Since the mean computed for each band is a scalar, the ensemble of computed means may be viewed as a mean vector (i.e., a vector, each element of which is a mean). Mean removal of this sort may be applied in either the log-power or cepstral domains. The mean vector has a dimensionality equal to the total number of frequency bands. Thus, sufficient data must be collected to provide a number of parameters (i.e., the mean vector elements) equal to the number of vector elements. This requires that several seconds of speech are typically required before techniques of this sort may be applied with success. Such techniques are, therefore, prone to the following difficulties:

a. insufficient data are available for the first few uttered words to compute the mean vector reliably;

b. if the running averaging accidentally incorporates a segment not containing speech data, the mean vector is incorrectly calculated, and recovery requires a long period to accumulate a meaningful new average.

Another technique applied for convolutional noise elimination is the RASTA technique in which linear filtering with a high-pass component is performed, corresponding to subtraction of the mean cepstrum over the preceding 200 milliseconds. A disadvantage of this technique is the introduction of a context dependence due to the fact that the subtracted component depends strongly on phonemes uttered in the immediate past.

It is to be noted that additive noise is not addressed by the foregoing techniques.

SUMMARY OF THE INVENTION

In accordance with one aspect of the invention, in one of its embodiments, there is provided a method for removing convolutional noise from a signal. The method has the steps of:

a. characterizing the signal with respect to a plurality of frequency bands, where the signal has a power in each frequency band;

b. computing a logarithm of a quantity characterizing the power in each frequency band over a specified interval of time for deriving a transform of the signal in a log-spectral domain;

c. fitting a smoothed log-power spectrum to the logarithm of the transform of the signal in the log-spectral domain for deriving a fitted log-power spectrum corresponding to the effect of convolutional noise in the logspectral domain; and d. removing a function of the fitted log-power spectrum from the transform of the signal in the log-spectral domain.

In accordance with alternate embodiments of the invention, the step of computing a logarithm may include computing a logarithm of a mean power of the signal in each frequency band, and the step of fitting a smoothed log-power spectrum may include selecting temporal frames for inclusion in the computation of the logarithm of the quantity characterizing the power in each frequency band. The step of computing a logarithm may include sampling the signal at discrete frames which may be include periods less than 20 milliseconds.

The step of fitting a smoothed log-power spectrum may include fitting a plurality of smoothly connected segments to the logarithm of the transform of the signal in the log-spectral domain as a function of frequency band where each segment is chosen from at least one of quadratic segments having negative quadratic coefficients and linear segments. The step of characterizing the signal may include assigning a power to each frequency band in a set of MEL-scaled bands.

In accordance with further embodiments of the invention, the step of fitting a smoothed log-power spectrum may include preliminarily compressing the quantity characterizing the power in each frequency band according to a specified compression criterion. The step of fitting a smoothed log-power spectrum may include fitting a spectrum subject to a constraint of a bandpass-like shape and may include performing a least-squares concave fit to a number of parameters less than the number of the plurality of frequency bands. The step of removing a function of the fitted log-power spectrum from the transform of the signal may include updating the fitted log-power spectrum for producing an updated mean vector estimate based on the transform of the signal during at least one succeeding period of time, and may also include subtracting the fitted log-power spectrum from the signal.

In accordance with another aspect of the present invention, there is provided a method for removing convolutional noise from a signal. The method has the steps of:

a. characterizing the signal with respect to a plurality of frequency bands, the signal having a power in each frequency band;

b. computing a function of a quantity characterizing the power of the signal in each frequency band over a specified interval of time for deriving a transform of the signal in a transform domain;

c. fitting a smoothed transform domain spectrum to the transform of the signal in the transform domain for deriving a fitted transform domain spectrum corresponding to the effect of convolutional noise in the transform domain; and d. removing a function of the fitted transform domain spectrum from the transform of the signal in the transform domain.

In accordance with a further aspect of the present invention, there is provided an apparatus for removing convolutional noise from a channel capable of carrying a signal. The apparatus has a spectral processor for transforming successive frames of the signal into a transform of the signal in a log-spectral domain and a memory register coupled to the spectral processor for storing a set of binned log-spectral amplitudes resulting from operation of the spectral processor. The apparatus also has a model processor for fitting a recursively smoothed model to the set of log-spectral amplitudes for deriving a fitted log-power spectrum corresponding to the effect of convolution noise in the log-spectral domain. The apparatus also has an output device for subtracting the recursively smoothed model from the transform of the signal to obtain a residual transform and for transmitting the residual transform for subsequent decoding.

BRIEF DESCRIPTION OF THE DRAWINGS

The invention will be more readily understood by reference to the following description, taken with the accompanying drawings, in which.

DETAILED DESCRIPTION OF PREFERRED EMBODIMENTS

In accordance with a preferred embodiment of the invention, the process of convolution noise elimination is accelerated by acquiring sufficient data to model a mean vector in terms of fewer parameters than the number of frequency bands, thereby reducing the duration of time intervals containing speech content that must be sampled to establish or update a mean vector for use in mean subtraction. Embodiments of the invention are described herein, without limitation, in the context of speech recognition, however advantages may be provided by the invention in other signal processing applications.

While embodiments of the invention are described herein in terms of the extraction of a "mean" vector for use in mean subtraction, it is to be understood that the methods and techniques described herein may be applied equally to the derivation of various other characteristics of the data vector, such, for example, as the median or maximum of the data vector. The term "mean," where it occurs, may be replaced, by way of example, by an operator X defined over the space of data vectors $\{x\}$, such that $X(x+a)=X(x)+a$, where x is the time-varying data vector and a is a constant vector in space $\{x\}$.

In practice, in accordance with a preferred embodiment of the invention, the logarithm of power in each of a plurality of frequency bands is collected on a frame by frame basis, with a frame being sampled at a specified rate, typically on the order of 10 milliseconds. The sampled frame contains spectral data corresponding to the spectral content of the sampling period, the spectral content obtained by means of a Fast Fourier transform of the temporal data. Other spectral representations of the data may also be used within the scope of the invention.

The frequency scale in terms of which the frame spectral data are represented may be any frequency scale employed in the analysis of speech or other signal data. By way of example, speech analysis often employs the MEL frequency bands based on empirical studies of subjective pitch perception. Alternatively, the frequency may be cast in terms of the perceptual BARK-scaled "critical" bands. Any binning of signal power into frequency bands is within the scope of the invention as described herein and in the appended claims.

Figure 1:
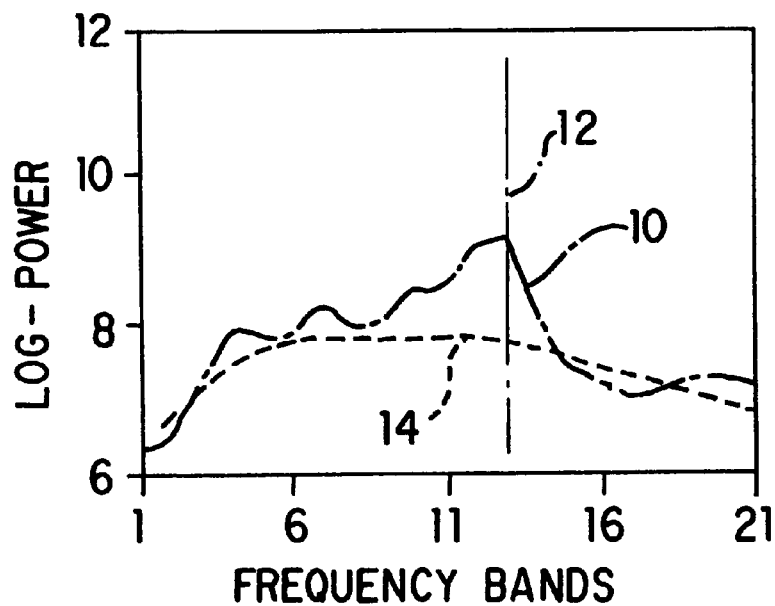
FIG. 1 is a plot of the log-spectrum of a speech-containing frame of signal data, before and after applying a bandpass modeling method in accordance with a preferred embodiment of the invention.

Referring to FIG. 1, the log-spectrum 10 is shown of signal data acquired over the course of a single frame, as transformed into a frequency domain. Numbered frequency bins are plotted along the abscissa, while the logarithm of the power in each band is plotted along the ordinate. As discussed above, the frequency binning may be performed in one of various methods known in the art of signal processing. The frame of transformed data depicted in FIG. 1 corresponds to a frame containing speech energy. Such frames may be referred to as "CMS-eligible" frames, in that they contain sufficient total energy as to usefully carry information relative to the convolving kernel which is to be removed in the noise elimination process. Selection of CMS-eligible frames is performed by a discriminator which rejects frames containing insufficient total energy to contribute substantially to derivation of a mean. "CMS" refers particularly to cepstral mean subtraction but is employed herein in a more general sense applicable to convolution noise elimination in log-spectral space, as well.

In accordance with embodiments of the invention, log-spectrum 10 may represent any log-spectral data vector, and is not limited to the particular log-spectral data vector captured during one temporal frame. For example, data from successive frames may be accumulated or averaged or processed, prior to the implementation of the smoothing that will be described in detail below. Additionally, the use of approximations to the logarithm or other functional dependencies or characteristics of the signal in place of the logarithm as described herein are also within the scope of the invention as claimed in the appended claims.

The particular shape of log-spectrum 10 may contain locally enhanced frequency channels, such as the channel designated by numeral 12. Locally enhanced channels may occur due to the fact that the energy in a speech signal is concentrated in formants, the dominant frequency characterizing resonances or regions of emphasis associated with different sounds. A speech-containing frame is likely to exhibit peaks at the formants of a phoneme expressed during that frame. Thus, if log-spectrum 10 were to be used as a component in removing a mean in the log-spectral domain, the mean would be contaminated by the presence of relatively localized peaks such as 12.

One method for suppressing the resonances such as 12, in accordance with embodiments of the present invention, is to smooth log-spectrum 10 in the log-spectral domain by a low-order model, i.e., a model containing a number K of free parameters that is less than the number N of frequency channels into which the signal data have been binned. In particular, log-spectrum 10 may be smoothed so as to exhibit no resonances and thus to model a convolutional contribution which, similarly, exhibits a bandpass magnitude response.

As a subsequent step, in accordance with certain embodiments of the invention, once frames that will enter the mean computation have been selected, the log-spectrum 10 of a frame may be compressed, so as to control the effect of speech formants. Thus, prominent peaks such as 12 are clipped in the process. The amount of compression may be more or less extensive, in accordance with the particular embodiment of the invention employed. Additionally, in accordance with alternate embodiments of the invention, non-linear filtering of various sorts known in the art may be applied prior to compression in order to obtain a robust estimate of the maximum value observed in order to prevent anomalous compression.

Log-spectrum 10, possibly compressed, is then smoothed by having fit to it a leastsquares model such as depicted by dashed curve 14. Model 14 may derived in the following manner. K intervals are defined over the entire range of frequency bands, corresponding, equivalently, to K+1 break points separating the intervals. A quadratic curve is defined over each interval, the quadratic curves being fit to log-spectrum 10, in the least-squares sense as commonly used in mathematics, using any numerical fitting algorithm known in the art. A quadratic segment defined on an interval indexedj, has the functional form:

$$q_j(x)=a_j(x-f_j)^2+b_j(x-f_j)+c_j,$$

for frequencies x between the jth and (j+1)th breakpoints.

In accordance with a preferred embodiment of the present invention, the quadratic segments fit over the respective frequency intervals are both continuous and differentiable at the breakpoints, such that the resulting model spectrum, in this case a piecewise quadratic, is a "well-behaved" function of the frequency band ordinal number, or, in other terms, "smoothly connected," as referred to by persons of ordinary skill in mathematics. Since several features of the model mean vector may be known a priori, certain conditions are advantageously imposed on the fitting procedure. The transfer function of the transmission/acquisition channel typically falls off sharply at both low and high frequencies, thus the desired mean vector has the shape of a band pass at central frequencies with sharp knees at low and high frequency cut-offs. Thus, the fit is constrained to be concave ("spilling water") as exhibited by model 14, corresponding to negative quadratic coefficients $a_j$. To enforce the bandpass shape, it may be necessary for some of the segments to be fit by linear segments rather than quadratic segments. The resultant fit is thus the smoothed model 14. In a preferred embodiment of the invention, the least squares fit is performed by removal of columns (those corresponding to a positive solution for some $a_j$ in the previous iteration) in a QR-decomposition until the smoothly concatenated quadratics and straight lines have a bandpass shape. Thus, initially, all segments have a free $a_j$ parameter estimated with the QR decomposition and, in each of a series of iterative steps, the coefficients of the quadratic segments are solved for. If a positive $a_j$ results, the column corresponding to the positive $a_j$ is removed from the QR, the corresponding $a_j$ is set to zero, and the quadratic segment is replaced with a straight line. The segment parameters are then solved for again, this process recurring until all the $a_j$'s are negative or zero. However, other methods of achieving the smoothed log-power or cepstral spectrum are within the scope of the invention as claimed in the appended claims.

Figure 2:
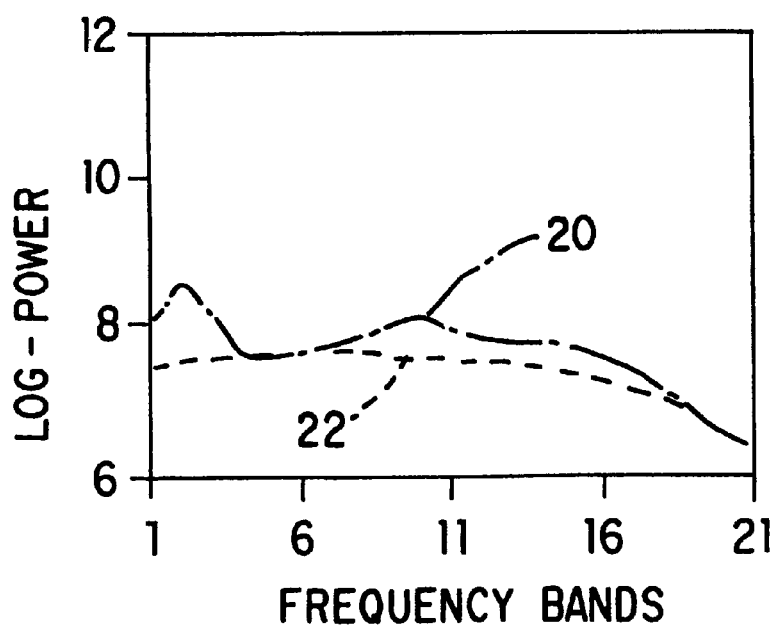
FIG. 2 is a plot of the log-spectrum of FIG. 1 averaged over a number exceeding 1000 of frames of signal data, before and after applying a bandpass modeling method in accordance with a preferred embodiment of the invention.

Referring now to FIG. 2, the mean of over 1000 frames of unsmoothed (raw) data is designated by curve 20, while the smoothed version, after application of the fitting algorithm described above, is designated by curve 22, having the prescribed concave bandpass shape.

In accordance with an embodiment of the invention, the mean, derived as described above, may be updated recursively, as known to persons skilled in the art. By way of example, the mean vector estimate (or, similarly, the estimate of any quantity characterizing the signal power in each frequency band) at frame t, designated $\mu_t$, may be updated from the mean vector estimate at frame t–1 by adding the residual of the log-power vector at frame t, weighted by the inverse of a time constant T corresponding, typically, to on the order of 50 frames, thus:

$$\mu_t = \mu_{t\&1} + \frac{1}{T}(x_t - \mu_{t-1}).$$

In addition to accumulation or updating of the mean vector estimate, other mathematical operations may be undertaken to modify the mean vector estimate. Similarly, useful output may be obtained by subtracting the mean vector estimate, or its equivalent as discussed, from the transform of the signal in the log-spectral domain or otherwise by operating on the signal using information embedded in the mean vector estimate.

Figure 3:
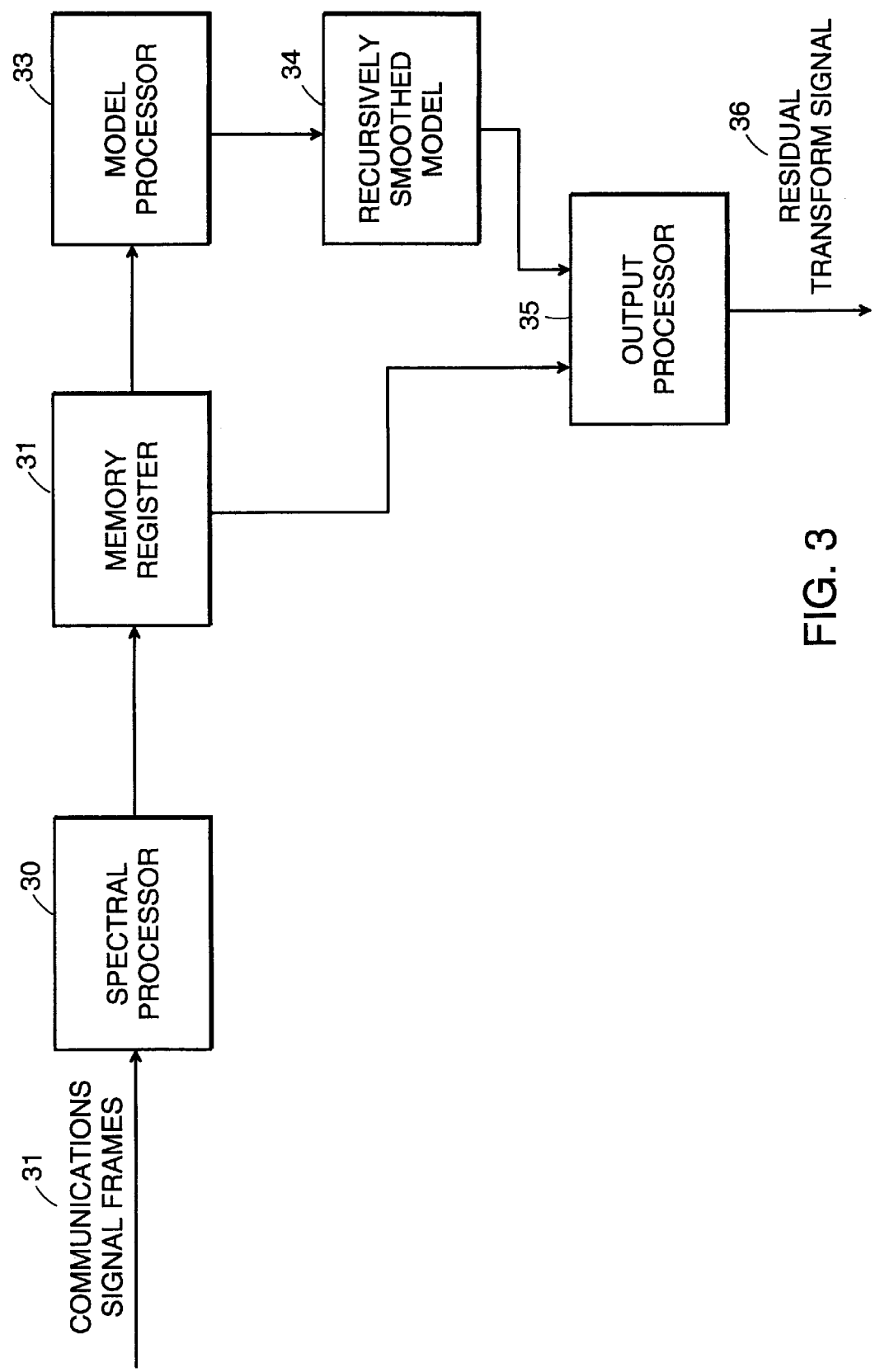
FIG. 3 is a logical block diagram of an apparatus for removing convolutional noise from a communications signal according to a preferred embodiment.

FIG. 3 is a logical block diagram of an apparatus for removing convolutional noise from a communications signal according to a preferred embodiment. A spectral processor 30 transforms successive frames of the signal 31 into a transform of the signal in a log-spectral domain. A memory register 32 is coupled to the spectral processor 30 and stores a set of log-spectral amplitudes resulting from operation of the spectral processor 30. A model processor 33 is in communication with the memory register 32 and fits a recursively smoothed model 34 to the set of log-spectral amplitudes for deriving a fitted log-power spectrum corresponding to the effect of convolution noise in the log-spectral domain. An output device 35 subtracts the recursively smoothed model 34 from the transform of the signal to obtain a residual transform 36 and transmits the residual transform for subsequent decoding.

The described embodiments of the invention are intended to be merely exemplary and numerous variations and modifications will be apparent to those skilled in the art. All such variations and modifications are intended to be within the scope of the present invention as defined in the appended claims.

What is claimed is:

1. A method for removing convolutional noise arising over a communications channel from an audio signal, the method comprising:

a. characterizing the signal with respect to a plurality of frequency bands, the signal having a power in each frequency band;

b. computing a logarithm of a quantity characterizing the power of the signal in each frequency band over a specified interval of time for deriving a transform of the signal in a log-spectral domain;

c. fitting a smoothed log-power spectrum to the transform of the signal in the log-spectral domain for deriving a fitted log-power spectrum corresponding to the effect of convolutional noise in the log-spectral domain; and d. removing a function of the fitted log-power spectrum from the transform of the signal in the log-spectral domain, so that convolutional noise has been removed from the transform of the signal.

2. A method according to claim 1, wherein the step of computing a logarithm includes computing a logarithm of a mean power of the signal in each frequency band.

3. A method according to claim 1, wherein the step of fitting a smoothed log-power spectrum includes selecting temporal frames for inclusion in the computation of the logarithm of the quantity characterizing the power.

4. A method according to claim 1, wherein the step of computing a logarithm includes sampling the signal at discrete frames.

5. A method according to claim 1, wherein the step of computing a logarithm includes sampling the signal at discrete frames including periods less than 20 milliseconds.

6. A method according to claim 1, wherein the step of fitting a smoothed log-power spectrum includes fitting a plurality of quadratic segments to the logarithm of the quantity characterizing the power in each frequency band as a function of frequency band.

7. A method according to claim 1, wherein the step of fitting a smoothed log-power spectrum includes fitting a plurality of smoothly connected segments to the logarithm of the quantity characterizing the power in each frequency band as a function of frequency band where each segment is chosen from at least one of quadratic segments and linear segments.

8. A method according to claim 1, wherein the step of fitting a smoothed log-power spectrum includes fitting a plurality of smoothly connected segments to the logarithm of the quantity characterizing the power in each frequency band as a function of frequency band where each segment is chosen from at least one of quadratic segments having negative quadratic coefficients and linear segments.

9. A method according to claim 1, wherein the step of characterizing the signal includes assigning a power to each frequency band in a set of MEL-scaled bands.

10. A method according to claim 1, wherein the step of fitting a smoothed log-power spectrum includes preliminarily compressing the quantity characterizing the power in each frequency band according to a specified compression criterion.

11. A method according to claim 1, wherein the step of fitting a smoothed log-power spectrum includes fitting a spectrum subject to a constraint of a bandpass-like shape.

12. A method according to claim 1, wherein the step of fitting a smoothed log-power spectrum includes performing a least-squares concave fit to a number of parameters less than the number of the plurality of frequency bands.

13. A method according to claim 1, wherein the step of removing a function of the fitted log-power spectrum from the transform of the signal includes updating the fitted log-power spectrum for producing an updated mean vector estimate based on the transform of the signal during at least one succeeding period of time.

14. A method according to claim 1, wherein the step of removing a function of the fitted log-power spectrum from the transform of the signal includes subtracting the fitted log-power spectrum from the signal.

15. A method for removing convolutional noise arising over a communications channel from an audio signal, the method comprising:

a. characterizing the signal with respect to a plurality of frequency bands, the signal having a power in each frequency band;

b. computing a function of a quantity characterizing the power of the signal in each frequency band over a specified interval of time for deriving a transform of the signal in a transform domain;

c. fitting a smoothed transform domain spectrum to the transform of the signal in the transform domain for deriving a fitted transform domain spectrum corresponding to the effect of convolutional noise in the transform domain; and d. removing a function of the fitted transform domain spectrum from the transform of the signal in the transform domain, so that convolutional noise has been removed from the transform of the signal.

16. An apparatus for removing convolutional noise arising over a communications channel from an audio signal, the apparatus comprising:

a. a spectral processor for transforming successive frames of the signal into a transform of the signal in a log-spectral domain;

b. a memory register coupled to the spectral processor for storing a set of log-spectral amplitudes resulting from operation of the spectral processor;

c. a model processor in communication with the memory register for fitting a recursively smoothed model to the set of log-spectral amplitudes for deriving a fitted log-power spectrum corresponding to the effect of convolution noise in the log-spectral domain; and d. an output device for subtracting the recursively smoothed model from the transform of the signal to obtain a residual transform and for transmitting the residual transform for subsequent decoding.

17. An apparatus according to claim 16, further including a discriminator for selecting temporal frames for inclusion in the computation of the logarithm of the quantity characterizing the power.

18. An apparatus according to claim 16, wherein the spectral processor includes a sampling arrangement for sampling the signal at discrete frames.

19. An apparatus according to claim 16, wherein the spectral processor includes a sampling arrangement for sampling the signal at discrete frames including periods less than 20 milliseconds.

20. An apparatus according to claim 16, wherein the model processor includes an arrangement for fitting a plurality of quadratic segments to the logarithm of the quantity characterizing the power in each frequency band as a function of frequency band.

21. An apparatus according to claim 16, wherein the model processor includes an arrangement for fitting a plurality of smoothly connected segments to the logarithm of the quantity characterizing the power in each frequency band as a function of frequency band where each segment is chosen from at least one of quadratic segments and linear segments.

22. An apparatus according to claim 16, wherein the model processor includes an arrangement for fitting a plurality of smoothly connected segments to the logarithm of the quantity characterizing the power in each frequency band as a function of frequency band where each segment is chosen from at least one of quadratic segments having negative quadratic coefficients and linear segments.

23. An apparatus according to claim 16, wherein the model processor includes an arrangement for preliminarily compressing the quantity characterizing the power in each frequency band according to a specified compression criterion.

24. An apparatus according to claim 16, wherein the model processor includes an arrangement for fitting a spectrum subject to a constraint of a bandpass-like shape.

25. An apparatus according to claim 16, wherein the model processor includes an arrangement for performing a least-squares concave fit to a number of parameters less than the number of the plurality of frequency bands.

* * * * *

UNITED STATES PATENT AND TRADEMARK OFFICE
CERTIFICATE OF CORRECTION

PATENT NO. : 6,044,340
DATED : March 28, 2000
INVENTOR(S) : Hugo Van Hamme

It is certified that error appears in the above-identified patent and that said Letters Patent is hereby corrected as shown below:

On the title page, please change the address of the Assignee from Ypres, Belgium to: Ieper, Belgium Signed and Sealed this Twenty-seventh Day of February, 2001

Attest:

NICHOLAS P. GODICI

Attesting Officer  Acting Director of the United States Patent and Trademark Office